United States Patent
Ghose et al.

(10) Patent No.: US 9,154,904 B2
(45) Date of Patent: Oct. 6, 2015

(54) METHOD AND SYSTEM FOR ACCURATE STRAIGHT LINE DISTANCE ESTIMATION BETWEEN TWO COMMUNICATION DEVICES

(71) Applicant: Tata Consultancy Services Limited, Mumbai Maharashtra (IN)

(72) Inventors: Avik Ghose, West Bengal (IN); Abhinav Jha, West Bengal (IN); Tapas Chakravarty, West Bengal (IN); Chirabrata Bhaumik, West Bengal (IN)

(73) Assignee: Tata Consultancy Services Limited, Mumbai Maharashtra (IN)

( * ) Notice: Subject to any disclaimer, the term of this patent is extended or adjusted under 35 U.S.C. 154(b) by 69 days.

(21) Appl. No.: 14/051,733

(22) Filed: Oct. 11, 2013

(65) Prior Publication Data
US 2014/0134948 A1 May 15, 2014

(30) Foreign Application Priority Data
Nov. 12, 2012 (IN) .......................... 3273/MUM/2012

(51) Int. Cl.
*H04W 4/00* (2009.01)
*G01S 5/02* (2010.01)
*H04W 4/02* (2009.01)

(52) U.S. Cl.
CPC ............... *H04W 4/008* (2013.01); *G01S 5/021* (2013.01); *G01S 5/0215* (2013.01); *G01S 5/0252* (2013.01); *G01S 5/0273* (2013.01); *G01S 5/0284* (2013.01); *H04W 4/023* (2013.01)

(58) Field of Classification Search
CPC ....... H04W 64/00; H04W 4/02; H04W 4/008; H04W 8/005; H04W 4/23; H04B 7/26; G01S 5/021; G01S 5/0215; G01S 5/0251; G01S 5/0273; G01S 5/0284
See application file for complete search history.

(56) References Cited

U.S. PATENT DOCUMENTS

| | | | |
|---|---|---|---|
| 6,859,761 B2 * | 2/2005 | Bensky et al. | 702/189 |
| 8,014,791 B2 | 9/2011 | Guigne et al. | |
| 8,027,640 B2 | 9/2011 | Contreras et al. | |
| 8,521,091 B2 * | 8/2013 | Miscopein et al. | 455/67.11 |

(Continued)

OTHER PUBLICATIONS

Silke Feldmann, Kyandoghere Kyamakya, Ana Zapater, Zighuo LUE/Institute of Communications Engineering, Hanover, "An indoor Bluetooth-based positioning system: concept, Implementation and experimental evaluation".

(Continued)

*Primary Examiner* — Nay A Maung
*Assistant Examiner* — Maryam Soltanzadeh
(74) *Attorney, Agent, or Firm* — Hayes Soloway, PC

(57) ABSTRACT

A method and system is provided for estimating proximity and accurately calculating the straight line distance between the communicating Bluetooth enabled portable communication devices. Particularly, the invention provides a method and system for capturing the received signal strength indicator (RSSI) values form at least one target communication device (204) by the reference communication device (202); calculating the constant values of properties of communication environment of the devices by utilizing captured received signal strength indicator (RSSI) values; and deriving accurate straight line distance between the reference communication device (202) and the target communication device (204) by utilizing calculated constant values of properties of communication environment of the devices.

9 Claims, 10 Drawing Sheets

(56) References Cited

U.S. PATENT DOCUMENTS

| | | | |
|---|---|---|---|
| 8,787,191 B2* | 7/2014 | Chen et al. .................... 370/252 |
| 2011/0028093 A1 | 2/2011 | Patel et al. |
| 2012/0295654 A1* | 11/2012 | Sridhara et al. ............... 455/517 |
| 2013/0029686 A1* | 1/2013 | Moshfeghi ................. 455/456.1 |
| 2014/0030982 A1* | 1/2014 | Cardona .................... 455/67.11 |
| 2014/0113652 A1* | 4/2014 | Maguire .................... 455/456.1 |

OTHER PUBLICATIONS

Futoshi Naya, Haruo Noma, Ren Ohmura, Kiyoshi Kogure /ATR Intelligent Robotics and Communication Laboratory, Japan, "Bluetooth-based Indoor Proximity Sensing for Nursing Context Awareness" ISWC'2005, IEEE.

Mohit Saxena, Puneet Gupta and Bijendra Nath Jain, "Experimental Analysis of RSSI-based Location Estimation in Wireless Sensor Networks".

Aswin N Raghavan, Harini Ananthapadmanaban, Manimaran S Sivamurugan, Balaraman Ravindran, "Accurate Mobile Robot Localization in indoor environments using Bluetooth".

Idigo V. E, Azubogu A.C.O, Ohaneme C.O, Isizoh A.N., "Comparative Performance Analysis of Empirical and Radio Propagation Model for Bluetooth Indoor Localization" International Journal of Innovative Technology and Exploring Engineering (IJITEE), ISSN: 2278-3075, vol. 1, Issue-3, Aug. 2012.

* cited by examiner

METHOD AND SYSTEM FOR ACCURATE STRAIGHT LINE DISTANCE ESTIMATION BETWEEN TWO COMMUNICATION DEVICES

FIELD OF THE INVENTION

The invention generally relates to the field of wireless communication. More particularly the invention relates to the system and method for calculating the accurate straight line distance between the two or more said Bluetooth devices by determining the proximity of a first Bluetooth enabled portable communication device with another Bluetooth enabled portable communication devices.

BACKGROUND OF THE INVENTION

Bluetooth enabled portable communication device, such as mobile phones, smart phones, personal digital assistants (PDAs), pagers, MP3 players, cellular telephones, instant messaging devices, portable compact disk (CD) players, wireless email devices and the like devices, is used by an individual in daily life. These devices have various advanced functionalities like digital media transfer, internet usage etc. enabled by the use of Bluetooth, infrared and other ways of communication. An advance application available these days in the devices enables proximity estimation of similar devices in the surrounding environment. In addition to the estimation of proximity, the distance calculation of the other similar devices also plays a vital role in the pairing of the device, for various purposes like communication, and data transfer. A host of prior arts disclose various ways for calculating the distance of the Bluetooth enabled device in the proximity, when there is significant distance of separation between the devices.

A received signal strength indicator (RSSI) gives a direct measure of the shortest distance between the transmitter device and the receiver devices, wherein the signal strength and distance is inversely proportional, i.e. weaker the received signal strength, greater is the separation between transmitter (Tx) and receiver (Rx). In addition to the distance measure, if there is the use of three or more such Tx/Rx stations, it is possible to compute the exact location of a particular receiver (NODE) on a 2D plane.

However, the presence of obstacles, soft-furnishings, walls, ceiling etc. indoor result in significant spatial and temporal variation of the radio signal. This variation results in uncertain position estimation as well as distance calculation between two points or devices. When the Bluetooth enabled devices are present in a close environment say indoor environment and the distance of separation between the Bluetooth enabled devices is considerably small, typically less than 4 meters in a closed environment or in a small room (or workspace say less than 12 feet), the uncertainty in the distance calculation increases.

The existing models treat this spatial variation as a Log-normal random distribution and based on the standard Friis formula the relationship between received signal strength & distance is estimated. The existing models work with large potential errors in distance prediction and actual measurements in the closed environment, as the emphasis is on achieving reasonable accuracy in predication for bigger spaces like ware-house, large sized workspace etc. The existing techniques are not able to predict the distance correctly for indoor locations with an accuracy radius of less than +/−2 meters.

For functional based people-centric proximity estimation, the need for better accuracy arises. Functional based people-centric proximity estimation requires identifying and knowing which of the given set of people, wherein each person is uniquely identified by the Bluetooth device ID incorporated in their respective mobile phones, are interacting with each other. The interaction of given set of people with enabled devices results in following situation:
1. Two or more persons are positioned at places separated by say 1-2 m;
2. A small set of persons will be in relative motion for a brief period of time say coming close to each other, followed by a period where they are stationary with respect to each other that are interacting actively.

Further, the present propagation models accept the fact that there will be more than 3-4 dB difference in RSSI prediction at a given distance and the actual measurements at a given point of time. That is why getting accuracy in indoor positioning still remains a significant challenge.

From the above discussed prior art it is observed that there is a need in the art to develop a system and method for better straight line distance estimation between two persons carrying Bluetooth enabled devices. Further there is a need to develop an accurate channel model for distance estimation that is accurate for short distances while retaining the functional requirements.

SUMMARY OF THE INVENTION

Before the present methods, systems, and hardware enablement are described, it is to be understood that this invention in not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention.

The present invention provides a method and system for estimating the proximity between Bluetooth enabled portable communication devices and further utilizing this proximity information for deriving accurate straight line distance between said devices.

In an embodiment of the invention a method is provided for capturing received signal strength indicator (RSSI) values from at least one target communication device (204) by the reference communication device (202); calculating constant values of properties of communication environment of the devices by utilizing captured received signal strength indicator (RSSI) values and deriving accurate straight line distance between the reference communication device (202) and the target communication device (204) by utilizing calculated constant values of properties of communication environment of the devices.

In an embodiment of the invention a system is provided for at least one reference communication device (202) and at least one target communication device (204), wherein the reference communication device (202) further comprises of a received signal strength indicator (RSSI) capturing module (208); at least one backend server (206), further comprising a constant value calculation module (210) and a straight line distance derivation module (212).

BRIEF DESCRIPTION OF DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and apparatus disclosed in the drawings.

DETAILED DESCRIPTION OF THE INVENTION

Figure 1:
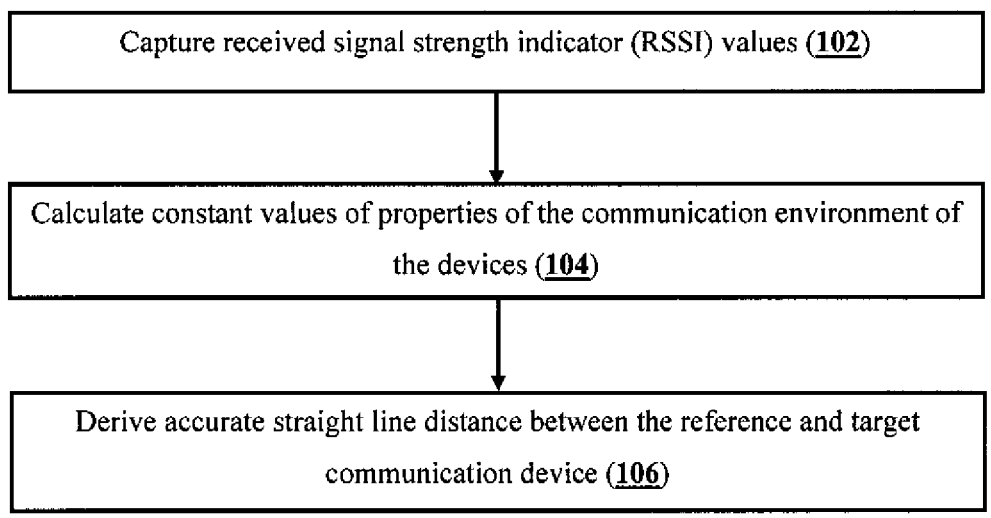
FIG. 1 shows a flow diagram (100) for deriving accurate straight line distance estimation.

Some embodiments of this invention, illustrating its features, will now be discussed: The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein, the singular forms "a," "an," and "the" include plural references unless the context clearly dictates otherwise. Although any systems, methods, apparatuses, and devices similar or equivalent to those described herein can be used in the practice or testing of embodiments of the present invention, the preferred, systems and parts are now described. The disclosed embodiments are merely exemplary of the invention, which may be embodied in various forms.

The disclosed embodiments are merely exemplary of the invention, which may be embodied in various forms.

The term "enabled device" refers to a portable communication device having Bluetooth and/or any device having Bluetooth and is used interchangeably. The device having Bluetooth is discoverable and identifiable by other enabled devices.

The present application provides a method for estimating proximity between at least one Bluetooth enabled portable reference communication device (202) and at least one Bluetooth enabled portable target communication device (204) for deriving accurate straight line distance between the reference communication device (202) and target communication device 204), the said method comprises processor implemented steps of:

a. capturing an received signal strength indicator (RSSI) values form at least one target communication device (204) by the reference communication device (202) using a received signal strength indicator (RSSI) capturing module (208);

b. calculating constant values of properties of communication environment of the devices by utilizing captured received signal strength indicator (RSSI) values using a constant value calculation module (210); and c. deriving accurate straight line distance between the reference communication device (202) and the target communication device (204) by utilizing calculated constant values of properties of communication environment of the devices using a straight line distance derivation module (212).

The present application provides a system for estimating proximity between at least one Bluetooth enabled portable reference communication device (202) and at least one bluetooth enabled portable target communication device (204) for deriving accurate straight line distance between the reference communication device (202) and target communication device (204), the said system comprises:

a. at least one reference communication device (202) and at least one target communication device (204), wherein the reference communication device (202) is further comprising a received signal strength indicator (RSSI) capturing module (208) adapted for capturing an received signal strength indicator (RSSI) values of at least one target communication device (204);

b. at least one backend server (206), further comprising a constant value calculation module (210) adapted for calculating constant values of properties of communication environment of the devices by utilizing captured received signal strength indicator (RSSI) values; and a straight line distance derivation module (212) adapted for deriving accurate straight line distance between the reference communication device (202) and the target communication device (204).

FIG. 1 refers to a flow diagram (100) for deriving accurate straight line distance estimation.

The process starts at the step 102, wherein at least one reference communication device (202) captures a received signal strength indicator (RSSI) from at least one target communication device (204). At the step 104, the constant values of properties of communication environment of the devices is calculated by utilizing captured received signal strength indicator (RSSI) values. The process ends at the step 106, an accurate straight line distance between the reference communication device (202) and the target communication device (204) is derived by utilizing calculated constant values of properties of communication environment of the devices.

Figure 2:
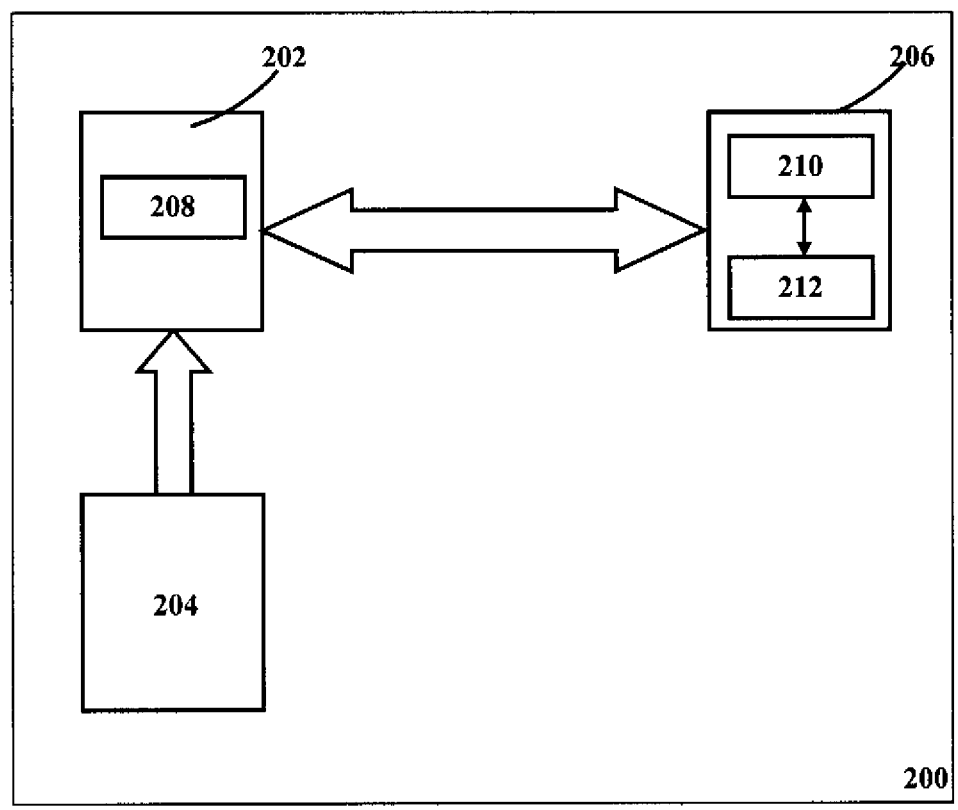
FIG. 2 shows a block diagram illustrating the system architecture (200) for deriving accurate straight line distance estimation.

Referring to FIG. 2 is a block diagram illustrating the system architecture for (200) deriving accurate straight line distance estimation. The system (200) in accordance with an embodiment may include at least one processor, an input/output (I/O) interface, and a memory. The at least one processor may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions stored in the memory.

The I/O interface may include a variety of software and hardware interfaces, for example, a web interface, a graphical user interface, and the like. The I/O interface may allow for system (200) interactions directly or through the devices. Further, the I/O interface may enable the system (200) to communicate with other computing devices, such as a portable reference communication device (202), a portable target communication device (204), as well as web servers and external data servers. The I/O interface can facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

The memory may include any computer-readable medium known in the art including, for example, non-transitory memory, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include modules.

The modules include routines, programs, objects, components, data structures, etc., which perform particular tasks or implement particular abstract data types. In one implementation, the modules may include a capturing module (208), a constant value calculation module (210), and a straight line distance derivation module (212), as discussed further herein.

As is shown in FIG. 2, the accurate straight line distance estimation architecture (200) comprises of a portable reference communication device (202); a portable target communication device (204); a backend server (206); a capturing module (208); a constant value calculation module (210) and a straight line distance derivation module (212).

According to an exemplary embodiment of the present invention a portable reference communication device (202) is adapted to capture a received signal strength indicator (RSSI) values form at least one portable target communication device (204). Further In an embodiment of the present invention a capturing module (208) is adapted for storing the captured RSSI values from said portable target communication device (204).

In an exemplary embodiment, the portable reference communication device (202) and the portable target communication device (204) may be selected from the group of Bluetooth enabled devices which includes mobile phones, smartphone, laptops, palmtops, personal data assistance (PDA), faxes, mobile phones, telephones, laptops, personal computers, printers, Global Positioning System (GPS) receivers, digital cameras, and video game consoles and the like.

In an exemplary embodiment, the portable reference communication device (202) may act as a reference point which can be stationary for the operation of capturing the RSSI values and the portable target communication device (204) may act as the target point that is either mobile or stationary.

In another exemplary embodiment, both the portable reference communication device (202) and the portable target communication device (204) are mobile.

The portable reference communication device (202) and the portable target communication device (204) are uniquely identified by the Bluetooth device ID incorporated in them. The unique identification of devices translates to unique identification of individual peoples.

An application embedded in the portable reference communication device (202) captures and records the RSSI values, and further stores captured and recorded RSSI values in the capturing module (208). The capturing module (208) stores the observed RSSI values for distance in ascending order beginning from 1 foot up to 10 feet, for the target communication device (204) from the portable reference communication device (202).

Further the backend server (206) is adapted to calculate the accurate distance between two people uniquely identified by respective MAC Id of the Bluetooth module. The backend server (206) is also configured to receive the RSSI values transmitted by the portable reference communication device (202). The backend server (206) further comprises of a constant value calculation module (210) and a straight line distance derivation module (212).

The constant value calculation module (210) adapted to calculate constant values of properties of communication environment of the devices by utilizing captured received signal strength indicator (RSSI) values. The constant value calculation module (210) performs calculation based on the mathematical equation mentioned below to calculate the constants:

$$L_d = L_0 + (c_1(|\sin(2\pi d/\Omega + \theta)|^2 + c_2)\log(d)$$

Where,
$L_d$=the RSSI at distance of the 'd' feet.
$L_0$=the RSSI at one foot,
$\Omega$=spatial wavelength of the channel (approximately determined from a limited set of measurements)
$c_1$ and $c_2$=constants that are properties of the environment in which the reading is taken.
$\theta$=a phase error owing to multipath which ranges from 0 to $\pi/2$.

The RSSI values are considered in ascending order of the distance from the portable reference communication device (202), followed by various known distances for up to 10 feet.

The RSSI values collected at the backend server (206) are utilized for the working of the equation mentioned above to obtain the values of $c_1$ and $c_2$ using standard curve fitting techniques. The RSSI value at 1 ft is needed for subsequent estimation. The 1 ft value gives the constant values used in the calculation for finding actual distance. The value at 1 ft differs for different communication environments like office spaces or shopping malls.

The straight line distance derivation module (212) is adapted for deriving the actual accurate distance between the two portable communication devices separated by small distance of 1 m to 10 m.

The straight line distance derivation module (212) stores the values of distance derived from the several well-known models for Indoor wave propagation for ISM bands and one of model used in the present invention is the Statistical Model. The Statistical Model calculates power-loss as a function for a given environment as follows:

$$L = L_0 + 10n \log(d) \text{(in dB)} \quad (1)$$

Where $L_0$ is the RSSI measured at 1 meter and used for calibration, L is the RSSI predicted at distance "d" meters. For a given environment the constant is referred as 'n'. For free-space, n=2 and for indoor environments, n is experimentally determined to be >2, typically n=4. The equation (1) implies that the RSSI follows a power decay function and that the relative distance between transmitter and the receiver can be uniquely determined if RSSI is measured. However, the actual RSSI curve is different due to multipath effects and hence distance cannot be calculated uniquely from RSSI. The measurements show that 2 or more distances can have identical RSSI value as measured.

The model according to equation (1) is further modified according to the Rappaport consideration to account for the multipath effects as lognormal random distribution $X_\sigma$ and the modified model is:

$$L = L_0 + 10n \log(d) + X_\sigma \quad (2)$$

According to another exemplary embodiment, in addition to the standard measurement method, the measurements by treating the relative angle of orientation between the two Bluetooth modules i.e. Tx and Rx as an important parameter of interest may be extended. The fundamental parameter of interest may be the relative distance.

Based on the large set of measurements, a statistical model that accurately represents the channel in a given environment is given below.

The modified equation $$L = L_0 + x \log(d) \qquad (3)$$

Where x is defined as follows:

$$x = c_1 (|\sin(2\pi d/\Omega + \theta)|^2 + c_2 \qquad (4)$$

Where, $L_0$=RSSI at unit distance (1 meter or 1 foot)

$c_1$ and $c_2$=constants which are properties of a given environment and the units of distance measurement.

$\Omega$=spatial wavelength of the channel (approximately determined from a limited set of measurements)

$\theta$=arbitrary measure of multipath phase effects, primarily catering for the relative orientation value ranging from 0 to $\pi/2$.

Putting the value of 'x' from equation (4) into equation (3) and adjusting the values of '$c_1$' and '$c_2$' for a given location, a reasonable good fit of the RSSI function with indoor multipath effects for distances up to ~12-14 feet.

In an exemplary embodiment, through the proposals given by equations 3 and 4, a new paradigm of modeling is introduced. The existing theories are shown in equation 1 and 2 which treats the distance variations given by 'd' in the equations (4) directly with path loss given by 'L'; with the others parameters being constant values based on measured data, the path loss as an attenuated sinusoid. Thus the spatial variations are not treated as random values, thus improving the probability of accurate estimation.

In an exemplary embodiment, the measurement tables below shows that while the model has a sense of predictability at shorter distances, the deviations increase for larger distances in excess of 4 meter, where randomness is more prevalent, as is evident from. Nevertheless, for shorter distances the proposed model is seen to accurate enough to enable us to predict proximity between two persons carrying mobile phones with Bluetooth with a potential for much better accuracy than existing.

TABLE 1

| RSSI 2 feet | Distance calculated | AVERAGE | Percentage Error |
|---|---|---|---|
| −52 | 2.176629932 | 1.732131 | 13.39342979 |
| −51 | 1.947734041 | | |
| −46 | 1.117519069 | | |
| −50 | 1.742908999 | | |
| −50 | 1.742908999 | | |
| −48 | 1.395612425 | | |
| −51 | 1.947734041 | | |
| −51 | 1.947734041 | | |
| −50 | 1.742908999 | | |
| −49 | 1.559623498 | | |

TABLE 2

| RSSI 4 feet | Distance calculated | Average | Percentage Error |
|---|---|---|---|
| −53 | 4.953032424 | 4.042639 | 1.065984406 |
| −51 | 3.320116923 | | |
| −51 | 3.320116923 | | |
| −52 | 4.055199967 | | |
| −51 | 3.320116923 | | |

TABLE 2-continued

| RSSI 4 feet | Distance calculated | Average | Percentage Error |
|---|---|---|---|
| −51 | 3.320116923 | | |
| −54 | 6.049647464 | | |
| −51 | 3.320116923 | | |
| −54 | 6.049647464 | | |
| −50 | 2.718281828 | | |

TABLE 3

| RSSI 6 feet | Distance calculated | Average | Percentage Error |
|---|---|---|---|
| −59 | 7.389056099 | 5.180466 | 13.65890471 |
| −54 | 3.617250785 | | |
| −56 | 4.813519741 | | |
| −56 | 4.813519741 | | |
| −53 | 3.135714764 | | |
| −53 | 3.135714764 | | |
| −58 | 6.405409432 | | |
| −57 | 5.552707876 | | |
| −57 | 5.552707876 | | |
| −59 | 7.389056099 | | |

TABLE 4

| RSSI 8 feet | Distance calculated | Average | Percentage Error |
|---|---|---|---|
| −56 | 8.292774682 | 9.240038 | 15.50047774 |
| −57 | 10.05120279 | | |
| −56 | 8.292774682 | | |
| −57 | 10.05120279 | | |
| −58 | 12.18249396 | | |
| −57 | 10.05120279 | | |
| −57 | 10.05120279 | | |
| −56 | 8.292774682 | | |
| −56 | 8.292774682 | | |
| −55 | 6.841978356 | | |

Figure 3:
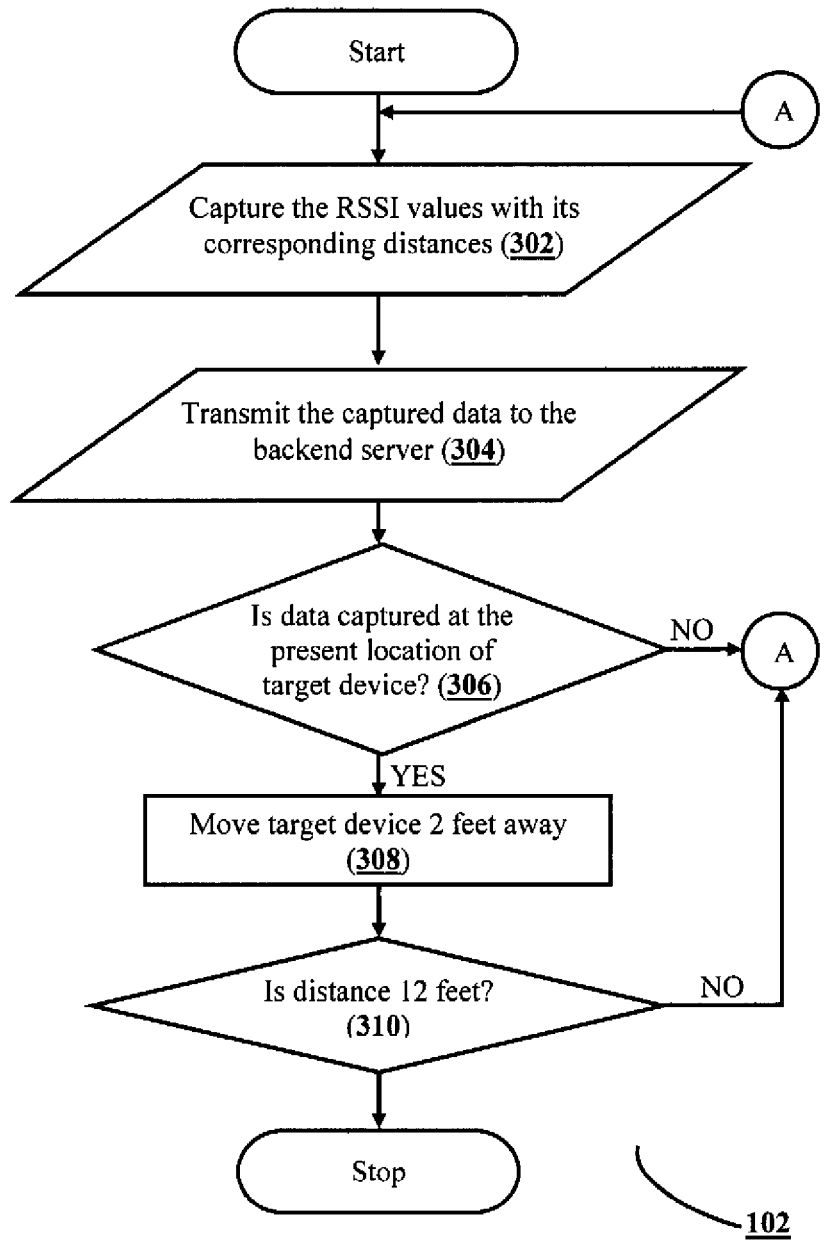
FIG. 3 shows a flow diagram (102) for capturing RSSI values at various distances.

FIG. 3 shows a flow diagram (102) for capturing RSSI values at various distances.

The process starts at the step 302, wherein the RSSI values are captured with the corresponding distances from the target portable communication devices (204). At step 304, the captured data in step 302, is transmitted to the backend server (206). At step 306, the location at which the data is captured is verified. If the data is already taken at the particular location the flow goes to the step 308. This step is important as it verifies the RSSI data is taken at every required location distance. At the step 308, in which the target device is moved 2 feet away from the current location for capturing RSSI values at this location. Further, the reading may be taken for distances to 10 ft. The process ends at the step 310, in which the same process is followed till the distance of target devices from reference device is 12 feet. Else the step 306 is repeated till the condition of step 310 is not achieved.

In an exemplary embodiment of the present invention, data posted from reference communication device (202) to the backend server (206) may be a tuple consisting of the RSSI value, the actual distance and the virtual location (room id) and the like. The backend server (206) reads the data and computes if it has enough readings for that distance. If there are enough readings, the application program interface (API) may return "OVER" else "CONTINUE". As soon as the application gets reply as "OVER" it may notify user to move another 1-2 foot away.

Figure 4:
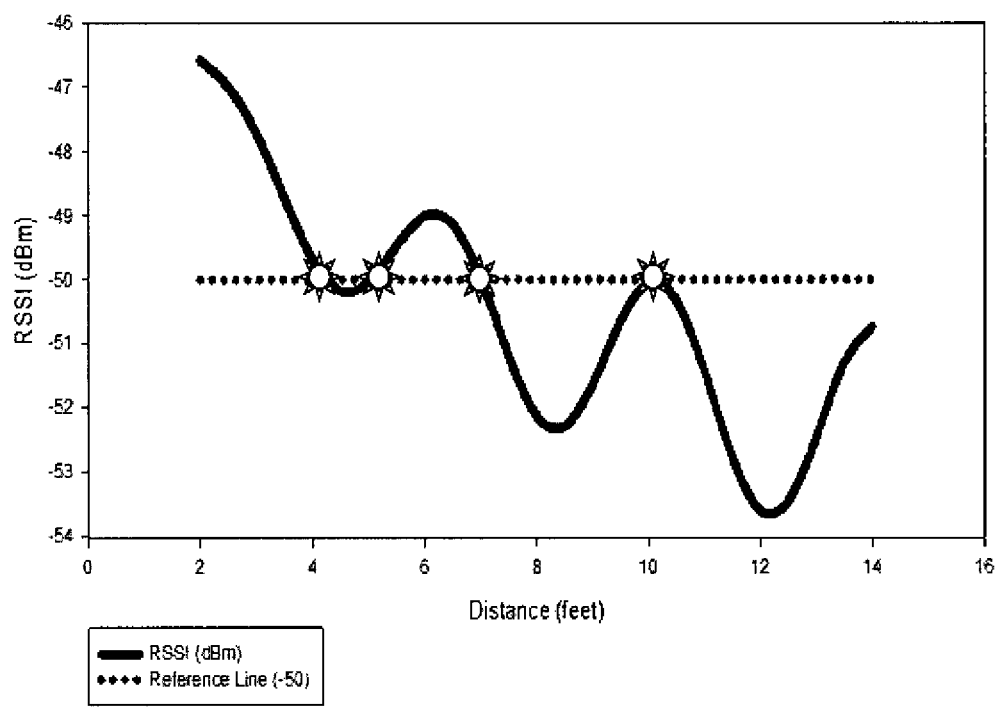
FIG. 4 shows a graph of RSSI versus distance using zero crossing.

FIG. 4 shows a graph of RSSI versus distance using zero crossing.

In an exemplary embodiment of the present invention, the curve arrived using equation $L_d=L_0+(c_1(|\sin(2\pi d/\Omega+\theta)|^2+c_2)\log(d)$ is of the form sin d*log D where 'd' is the distance. The direct solution to such a curve may be highly complex and hence there is need for an indirect solution using "zero crossing". Rephrasing the equation above, $$L_d-L_0=(c_1(|\sin(2\pi d/\Omega+\theta)|^2+c_2\log(d)$$

In an exemplary embodiment of the present invention, from the above rephrased equation that, all the RSSI terms are on LHS, and the RHS consists of terms dependent on distance and relative orientation.

In an exemplary embodiment of the present invention, the orientation in the determination phase may be unknown for our initial phase, thus fix $\theta=\pi/4$ since it may range from 0 to $\pi/2$, the mean value and acknowledge the fact that there will always be an error corresponding to a maximum of $\pi/4$ phase difference. Since the contribution of phase is +/−3 dB it is clear that the error may only cause a deviation of ~0.5 feet, which is acceptable. Thus may be a possibility of correcting the orientation using accelerometer and gyroscope readings of the smartphone assuming that both parties have a smartphone, to minimize this error. If one of the participants has a feature-phone which does not have the required sensors, then an error of ~0.5 feet is distance estimation may be considered.

In an exemplary embodiment of the present invention, as per the rephrased equation if the LHS and the RHS is computed by putting 'd' from 1 foot to 12 feet with a step of 0.1 is plotted to get a curve that will have several overlap points between LHS and RHS each pointing to a possible solution for that value of RSSI, as shown in FIG. 4, where all star-marked points are possible solutions.

In an exemplary embodiment of the present invention, if there are further RSSI measurements then the zero-crossings is calculated again, to get another set of distance measurements. After a set of such measurements the at most number of solutions will be around the actual distance is assumed. Hence the distance measurements are divided into clusters and then the centroid of the most populous cluster is found, which will give the actual distance.

Figure 5:
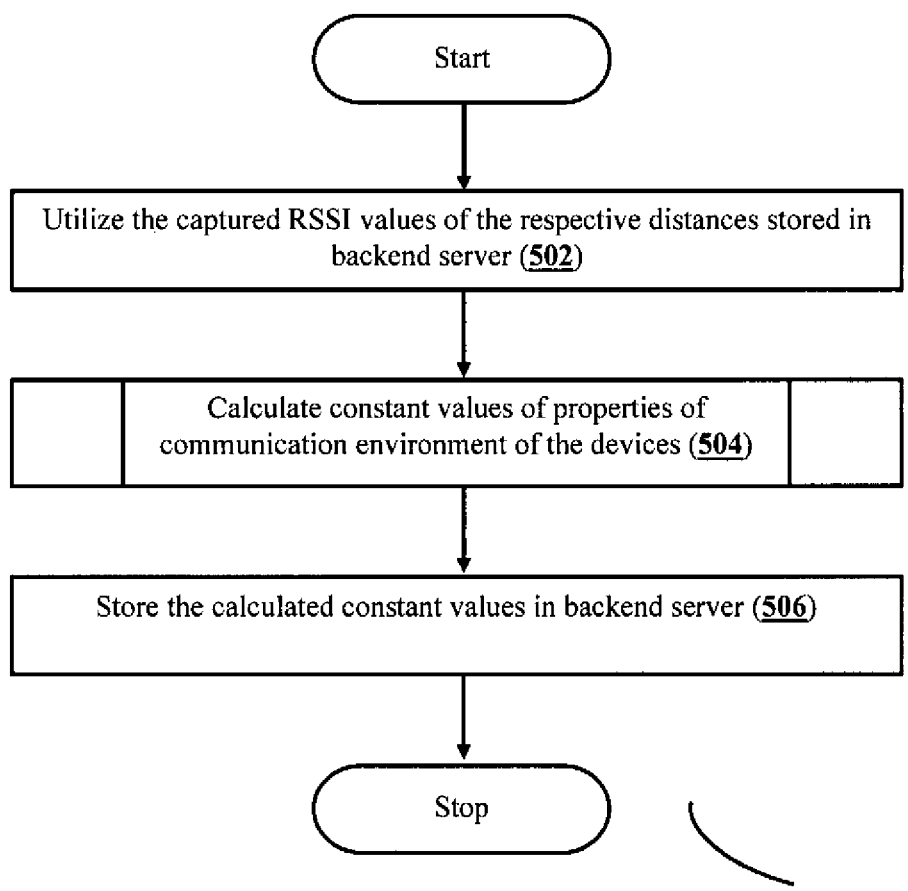
FIG. 5 shows a flow diagram (104) for calculating the constant values of properties of communication environment of the devices.

FIG. 5 shows a flow diagram (104) for calculating the constant values of properties of communication environment of the devices.

The process starts at step 502, wherein the captured RSSI values of the respective distances stored in the backend server (206) retrieved and utilized in step 504. At the step 504, the constant values of the properties of communication environment of the devices is calculated. The process ends at step 506, wherein the constant values are stored in the backend server (206).

In an exemplary embodiment of the present invention, the constant value calculation module (210) uses the below mentioned formula for the calculation of constant values:

$$L_d=L_0+(c_1(|\sin(2\pi d/\Omega+\theta)|^2+c_2\log(d)$$

Where,
$L_d$=the RSSI at distance of the 'd' feet.
$L_0$=the RSSI at one foot,
$\Omega$=spatial wavelength of the channel (approximately determined from a limited set of measurements)
c1 and c2=constants that are properties of the environment in which the reading is taken.
$\theta$=a phase error owing to multipath which ranges from 0 to $\pi/2$.

Figure 6:
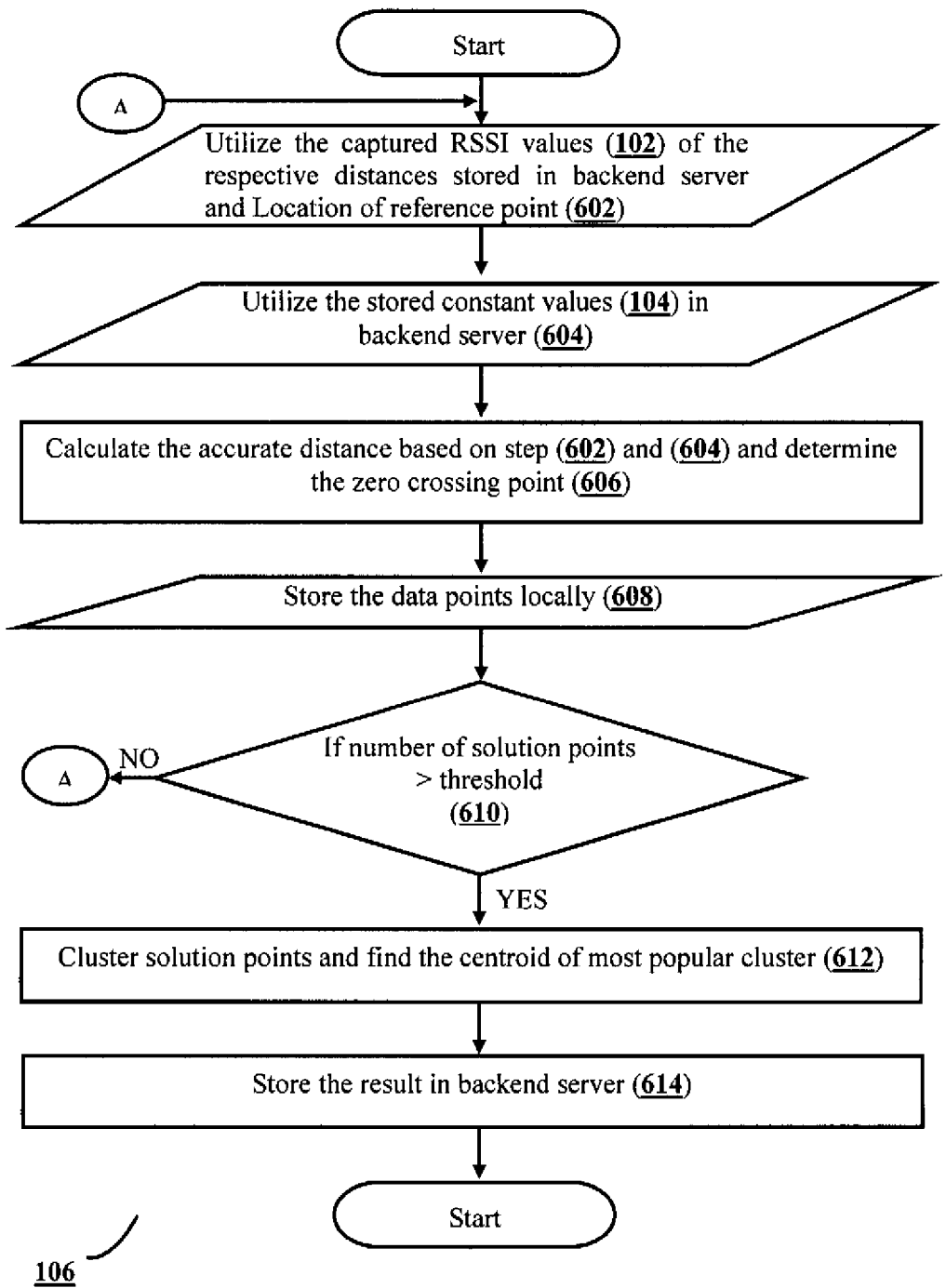
FIG. 6 shows a flow diagram (106) for deriving accurate straight line distance and creating clusters of solution points.

FIG. 6 shows a flow diagram (106) for deriving accurate straight line distance and creating clusters of solution points.

The process starts at step 602, wherein the stored RSSI values of the respective distances stored in backend server (206) and the location of the reference communication device is retrieved. At the step 604, the stored constant values in the backed server (210) are retrieved. At the step 606, the accurate straight line distance is calculated based on step 602 and step 604 and the zero crossing point is determined. At the step 608, the data points are stored locally. At the step 610, the condition of the predefined threshold is verified. If the predefined threshold is less than the number of solution or data points stored then the flow is given to the next step 612. At the step 612, the cluster of solution points is created and the centroid of the most popular cluster is found. In this step for each RSSI value a distance is calculated using clustering method. The process ends at step 614, wherein the result of the step 612 along with the centroid information is stored in the backend server.

In an exemplary embodiment of the present invention, readings of RSSI get posted from the reference communication device (202) to the backend server (206) and for each value a distance is calculated using clustering method. A final estimated distance is calculated and stored into the backend server (206). There is no manual intervention for each value of RSSI received, the backend server (206) fetches all values of RSSI for the reference communication device in a previous time window of ~1 min and then performs the calculation when a threshold number of distance estimates are clustered. The process is shown in FIG. 6.

Figure 7:
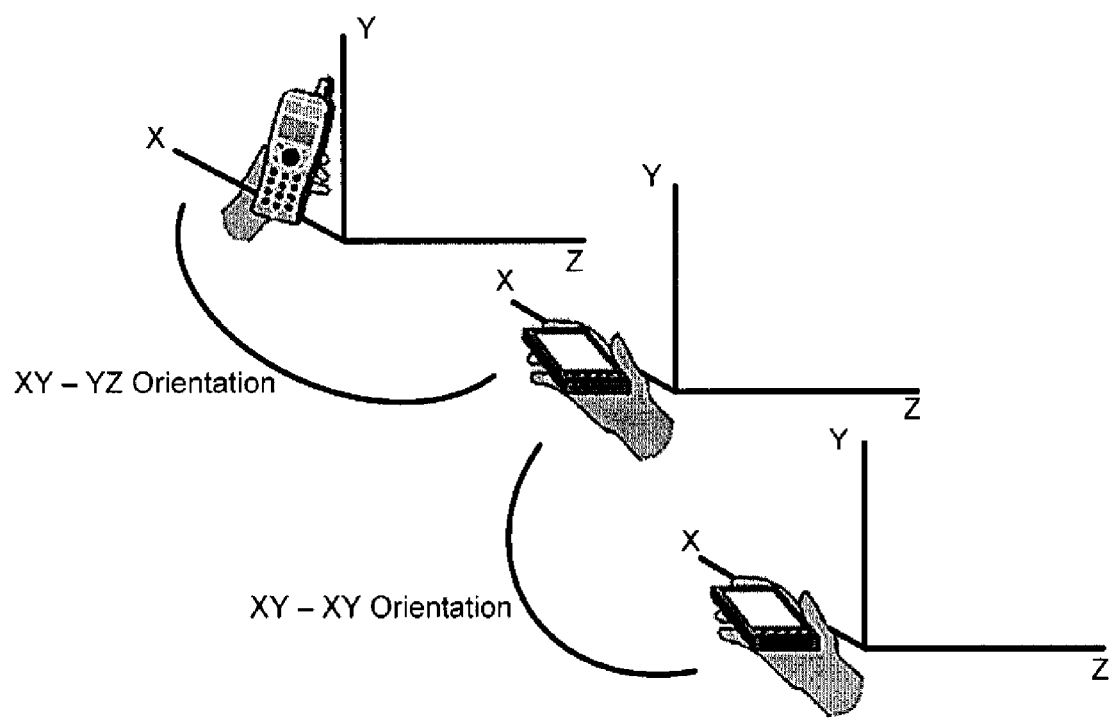
FIG. 7 shows phone relative orientations used for data collection.

FIG. 7 shows phone relative orientations used for data collection.

In an exemplary embodiment of the present invention, the FIG. 7 shows the relative orientations of the two Bluetooth enabled phones while measuring RSSI at a particular distance. Through extensive measurements and empirical fitment, the effect of relative orientation as a model parameter is included.

Figure 8:
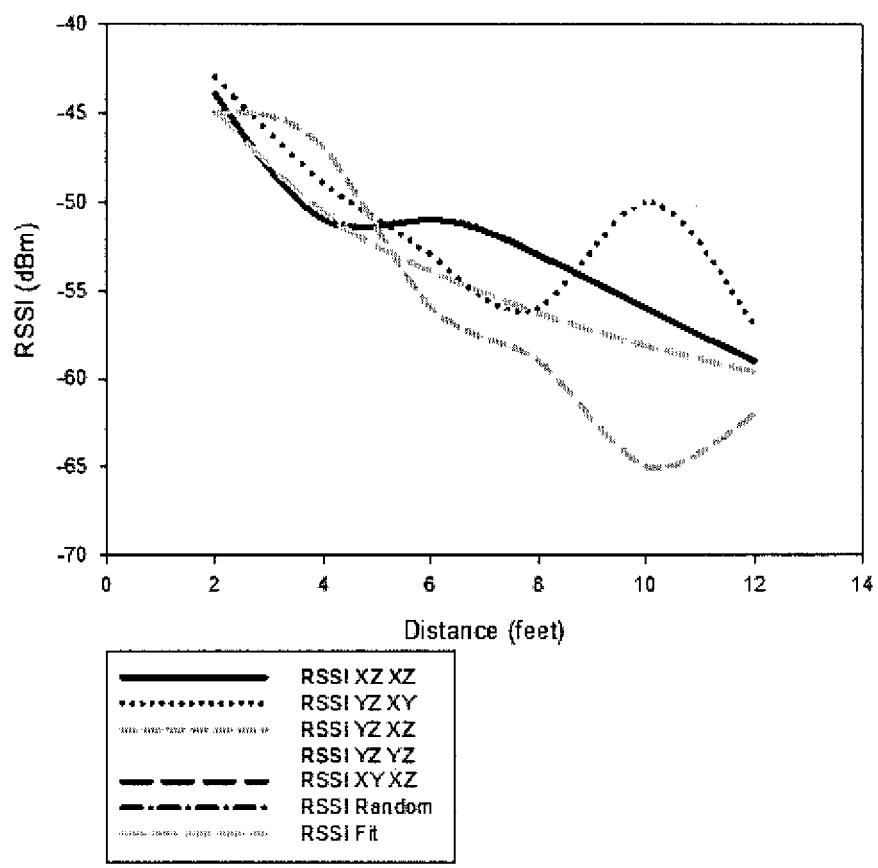
FIG. 8 shows a graph of measured RSSI versus distance for various phone orientations.

FIG. 8 shows a graph of measured RSSI versus distance for various phone orientations.

In an exemplary embodiment of the present invention, the FIG. 8 shows RSSI measurements over distance in feet carried out by varying the relative orientations between two phones in quick succession. Also plotted is the RSSI fit curve using classical approach. Clearly the fit curve does not model the calculated RSSI values very correctly. Certainly, it does not take into account the relative orientations. The effect of relative orientation is not random; therefore can be modelled accurately. Also a sinusoidal nature of the RSSI function is also considered.

Figure 9:
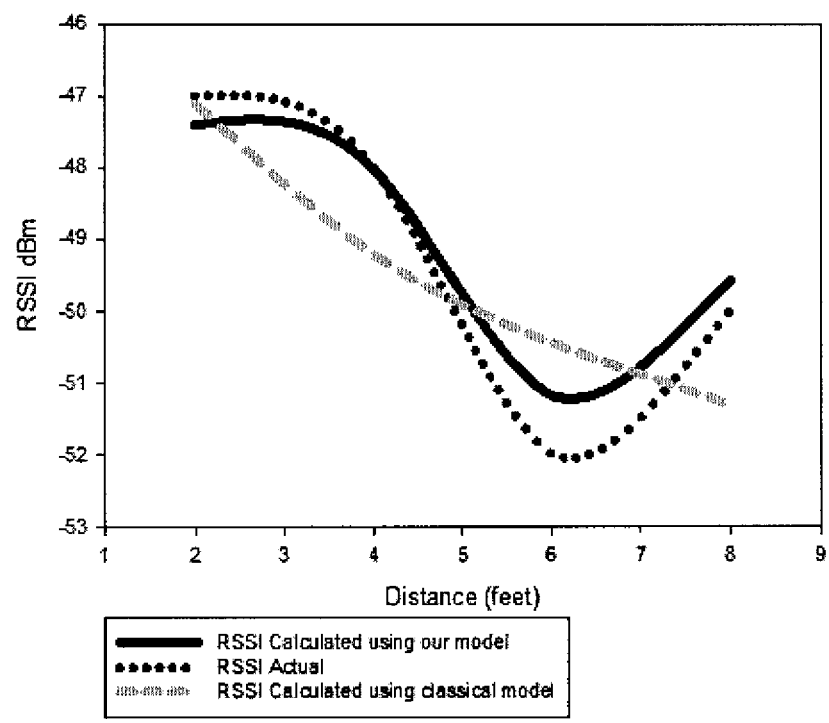
FIG. 9 shows a graph of comparison of measured RSSI with the models.

FIG. 9 shows a graph of comparison of measured RSSI with the models.

In an exemplary embodiment of the present invention, the FIG. 9 shows the comparison of proposed channel model with a measured data for RSSI. Also compared is the classical method. The proposal offers a definite fitment for the spatial variation typically seen in closed environments.

In an exemplary embodiment of the present invention, the measurements show that while the model has a sense of predictability at shorter distances, as shown in FIG. 7, deviations increase for larger distances in excess of 4 meter (typically), where randomness is more prevalent, as is evident from FIG. 8. Nevertheless, for shorter distances our proposed model is seen to accurate enough to enable us to predict proximity (between two persons carrying mobile phones with Bluetooth) with a potential for much better accuracy than before as plotted in FIG. 9.

Figure 10:
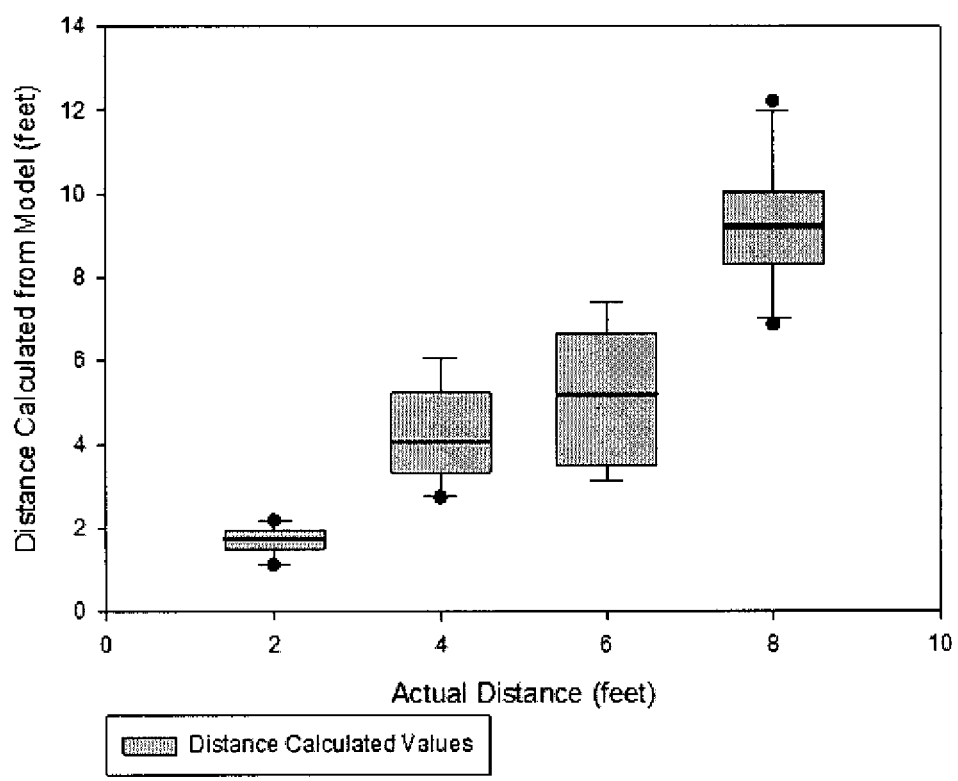
FIG. 10 shows a graph of estimated distance calculated from measured RSSI of the exemplary embodiment.

FIG. 10 shows a graph of estimated distance calculated from measured RSSI of the exemplary embodiment.

In an exemplary embodiment of the present invention, the FIG. 10 shows the results of distance estimation experiment carried out using the proposed channel model. The X axis contains the actual distance at which the RSSI reading was taken and Y axis shows the distance calculated using $L=L_0+x \log(d)$, after the model was trained with ground truth to calibrate c1, c2 and θ. The red line shows the mean value for the calculated distance and the grey square is the error margin. Here, for each distance a series of RSSI measurements is taken; estimate distance from each measured value of RSSI by using equation $L=L_0+10n \log(d)+X_\sigma$ and equation $L=L_0+x \log(d)$, compute the mean of measurements.

We claim:

1. A method for estimating proximity between a reference communication device (202) and a target communication device (204) for deriving accurate straight line distance between the reference communication device (202) and the target communication device (204), the method comprising:

representing a channel associated with the reference communication device (202) and the target communication device (204) in a form of a statistical model, wherein the channel is represented in an environment, and wherein the statistical model is based upon an equation, $L_d = L_0 + (c_1(|\sin(2\pi d/\Omega+\theta)|^2 + c_2) \log(d)$, wherein, $L_d$ is indicative of received signal strength indicator (RSSI) value at a distance 'd', and wherein L0 is indicative of RSSI value at a unit distance, and wherein c1 and c2 are constants indicating properties of the environment and units of distance measurement, wherein Ω is indicative of spatial wavelength of the channel, and wherein θ is measure of multipath phase effects indicating a relative angle of orientation between the reference communication device and the target communication device;

calculating values of the constants $c_1$ and $c_2$ using the equation, wherein the values of the constants $c_1$ and $c_2$ are calculated by a constant value calculation module (210), and wherein the values of the constants $c_1$ and $c_2$ are calculated corresponding to RSSI values captured for known distances;

capturing a received signal strength indicator (RSSI) value from the target communication device (204) by the reference communication device (202) using a RSSI capturing module (208); and deriving an accurate straight line distance between the reference communication device (202) and the target communication device (204) by using a straight line distance derivation module (212), wherein the straight line distance is derived by, substituting in the equation, the values of the constants $c_1$ and $c_2$ calculated, the received signal strength indicator (RSSI) value, the RSSI value at the unit distance, the spatial wavelength of the channel and the relative angle of orientation between the reference communication device (202) and the target communication device (204).

2. The method of claim 1, wherein the reference communication device (202) recognizes the target communication device (204) using at least one of a Bluetooth name and a MAC identification (ID) of the target communication device (204) for capturing the RSSI value.

3. The method of claim 1, wherein the reference communication device (202) and the target communication device (204) are separated by a distance having a range between 2 feet to 10 feet.

4. The method of claim 1, wherein the reference communication device (202) and the target communication device (204) communicates at a frequency band of 2.4 GHz to 2.48 GHz.

5. The method of claim 1, wherein the RSSI value is measurement of a signal strength of the communication between the reference communication device (202) and the target communication device (204).

6. The method of claim 1, wherein the RSSI value captured from the target communication device (204) is read for one foot and followed by a predefined distance of up to ten feet by the reference communication device (202).

7. The method of claim 1, wherein the reference communication device (202) and the target communication device (204) are selected from a group comprising at least one of mobile phones, tablets, ultra books, Smartphone, laptops, palmtops, personal data assistant (PDA), faxes, telephones, laptops, personal computers, printers, Global Positioning System (GPS) receivers, digital cameras, and video game consoles.

8. A system for estimating proximity between a reference communication device and a target communication device for deriving accurate straight line distance between the reference communication device (202) and the target communication device (204), the system comprising:

a reference communication device (202) and a target communication device (204), wherein the reference communication device (202) comprises a received signal strength indicator (RSSI) capturing module (208) adapted to capture RSSI value of the target communication device (204); and a backend server (206) comprising a constant value calculation module (210) and a straight line distance derivation module (212), wherein the constant value calculation module (210) is adapted to calculate constant values $c_1$ and $c_2$ indicating properties of an environment of the reference communication device (202) and the target communication device (204) by using an equation $L_d = L_0 + (c_1 (|\sin(2\pi d/\Omega+\theta)|^2 + c_2) \log(d)$, wherein, $L_d$ is indicative of a received signal strength indicator (RSSI) value at a distance 'd', and wherein $L_0$ is indicative of RSSI value at a unit distance, and wherein $c_1$ and $c_2$ are constants indicating properties of the environment and units of distance measurement, wherein ,Ω is indicative of a spatial wavelength of the channel, and wherein θ is measure of a multipath phase effects indicating a relative angle of orientation between the reference communication device and the target communication device, and wherein the straight line distance derivation module (212) is adapted to derive an accurate straight line distance between the reference communication device (202) and the target communication device (204)) by substituting in the equation the values of the constants $c_1$ and $c_2$ calculated, the received signal strength indicator (RSSI) value, the RSSI value at the unit distance, the spatial wavelength of the channel and the relative angle of orientation between the reference communication device (202) and the target communication device (204).

9. A non-transitory computer readable medium embodying a program executable in a computing device for estimating proximity between a reference communication device and a target communication device for deriving accurate straight line distance between the reference communication device (202) and the target communication device (204), the program comprising computer readable medium instructions for:

representing a channel associated with the reference communication device (202) and the target communication device (204) in form of a statistical model, wherein the channel is represented in an environment, and wherein the statistical model is based upon an equation, $L_d = L_0 + (c_1 |\sin(2\pi d/+\theta)|^2 + C_2)\log(d)$, wherein, $L_d$ is indicative of a received signal strength indicator (RSSI) value at a distance 'd', and wherein $L_0$ is indicative of RSSI value at a unit distance, and wherein $c_1$ and $c_2$ are constants indicating properties of the environment and units of distance measurement, wherein $\Omega$ is indicative of a spatial wavelength of the channel, and wherein $\theta$ is measure of a plurality of multipath phase effects indicating a relative angle of orientation between the reference communication device and the target communication device;

calculating values of the constants $c_1$ and $c_2$ using the equation, wherein the values of the constants $c_1$ and $c_2$ are calculated by a constant value calculation module (210), and wherein the values of the constants $c_1$ and $c_2$ are calculated corresponding to RSSI values captured for known distances;

capturing a received signal strength indicator (RSSI) value from the target communication device (204) by the reference communication device (202) using a RSSI capturing module (208); and deriving an accurate straight line distance between the reference communication device (202) and the target communication device (204) by using a straight line distance derivation module (212), wherein the straight line distance is derived by, substituting in the equation, the values of the constants $C_1$ and $c_2$ calculated, the received signal strength indicator (RSSI) value, the RSSI value at the unit distance, the spatial wavelength of the channel and the relative angle of orientation between the reference communication device (202) and the target communication device (204).

* * * * *